United States Patent
Goinski

(10) Patent No.: US 7,404,713 B2
(45) Date of Patent: Jul. 29, 2008

(54) INLET NOZZLE FOR HOT RUNNER SYSTEM

(75) Inventor: Michael Goinski, Rodgau (DE)

(73) Assignee: Incoe Corporation, Troy, MI (US)

( * ) Notice: Subject to any disclaimer, the term of this patent is extended or adjusted under 35 U.S.C. 154(b) by 163 days.

(21) Appl. No.: 11/307,301

(22) Filed: Jan. 31, 2006

(65) Prior Publication Data
US 2007/0269546 A1  Nov. 22, 2007

(51) Int. Cl.
*B29C 45/00* (2006.01)
(52) U.S. Cl. .............. 425/563; 425/562; 425/547; 425/572
(58) Field of Classification Search ........... 425/547, 425/560, 561, 562, 563, 564, 572
See application file for complete search history.

(56) References Cited

U.S. PATENT DOCUMENTS

| | | | | |
|---|---|---|---|---|
| 4,678,427 A | * | 7/1987 | Fritzsche | 425/562 |
| 4,695,238 A | * | 9/1987 | Taniguchi | 425/145 |
| 5,012,839 A | * | 5/1991 | Rogers et al. | 137/341 |
| 5,164,207 A | * | 11/1992 | Durina | 425/382.4 |
| 2004/0191357 A1 | * | 9/2004 | Babin | 425/564 |
| 2007/0132146 A1 | * | 6/2007 | Klobucar | 264/328.1 |

* cited by examiner

*Primary Examiner*—Yogendra Gupta
*Assistant Examiner*—Maria Veronica D Ewald
(74) *Attorney, Agent, or Firm*—John A. Artz

(57) ABSTRACT

A shutoff valve mechanism for a plastic injection molding system and process. The shutoff valve mechanism is positioned between the nozzle of the injection molding machine and the hot runner manifold. Force applied by the machine nozzle moves an inner body member in the shutoff valve mechanism and opens a valve allowing molten plastic material to flow through the valve and into the hot runner, sprue bushings, and mold cavities. A biasing mechanism, such as a plurality of spring washer members, returns the inner body member to its rest position, thereby closing the valve mechanism when the machine nozzle is retracted.

4 Claims, 4 Drawing Sheets

INLET NOZZLE FOR HOT RUNNER SYSTEM

TECHNICAL FIELD

The present invention relates generally to plastic injection molding systems, and more particularly to shut-off valves between machine nozzles and hot runner manifolds.

BACKGROUND OF THE INVENTION

Plastic injection molding machines and systems are in common use today. The majority of plastic products and components that are in use today are made by plastic injection molding processes. In plastic injection molding systems, an injection molding machine melts plastic material and then injects the molten plastic material through a machine nozzle into a mold cavity. Typically, a hot runner manifold or system and a plurality of sprue bushings are positioned between the machine nozzle and the mold cavity. The hot runner manifolds distribute the molten plastic material from the machine nozzle through the sprue bushings and into multiple cavities in the mold or into different areas of a large cavity in a mold.

In a typical injection molding process, the molten plastic material injected into the mold cavity is allowed to cool and harden sufficiently so that it can be removed or ejected from the mold. In a typical plastic injection molding cycle, the plastic material is first injected into the mold cavity, the plastic material is allowed to cool and harden for a predetermined period of time, and then the mold is opened, allowing the molded part to be removed or ejected. Subsequently, the mold is closed and the cycle is repeated. Typically, the cycle is repeated over and over throughout a work shift or several work shifts until the requisite number of molded plastic parts are produced.

In some plastic injection molding processes, it is necessary to retract the machine nozzle from the hot runner manifold between the processing cycles. This can occur, for example, with rotary molds and stack molds. In these molding processes, when the machine nozzle is retracted, it is necessary to prevent the backflow of plastic material from the manifold which could affect subsequent processing cycles or produce substandard molded parts.

Several shutoff nozzles or mechanisms have been provided in the past in order to prevent such backflow of molten plastic material from hot runner manifolds. However, not all of the shut-off valves have been successful, and many do not have universal applications or are not able to be easily modified for different applications.

SUMMARY OF THE INVENTION

It is thus an object of the present invention to provide an improved shutoff valve mechanism for plastic injection molding machines and processes. It is also an object of the present invention to provide a shutoff valve mechanism which automatically closes the inlet to hot runner manifolds when the machine nozzle has been retracted and is no longer applying a force.

It is a further object of the present invention to provide a plastic injection molding system and process which maintains the internal pressure in the hot runner system and prevents ambient air from entering the system when the machine nozzle is retracted.

These and other objects and purposes are met by the present invention which provides an improved shutoff valve mechanism for plastic injection molding processes and systems. The shutoff valve mechanism is adapted to be positioned between the machine nozzle and the hot runner manifold, particularly in stack molding applications, rotary molding operations and for vertical clamp injection molding machines. The shutoff valve mechanism has a movable valve member which is spring biased to a closed position with a stationary valve member in the shutoff valve mechanism. Movement of the machine nozzle to its injection position provides a force opposite to the biasing force and opens the valve in the shutoff valve mechanism. This allows the molten plastic material to flow from the machine nozzle through and into the hot runner manifold and sprue bushings and into the mold cavity or cavities.

The stationary valve member is a pin member positioned in the plastic passageway in the shutoff valve mechanism. The movable pin member is spring loaded by one or more spring members, such as stacked Belleville spring washers which bias the movable valve member to its open valve position.

With the present invention, the inlet nozzle of the hot runner can be directly connected and assembled to the hot runner manifold. The valve mechanism will automatically close the inlet when the machine nozzle is retracted and no longer applying a force.

The present invention allows the internal pressure of the hot runner system to be retained and also prevents ambient air from entering the system which could cause inconsistencies in the molding process and lead to poor part quality.

These and other details, features and benefits of the invention will become apparent from the following description of the invention, when viewed in accordance with the attached drawings and appended claims.

DESCRIPTION OF THE PREFERRED EMBODIMENT(S)

Figure 1:
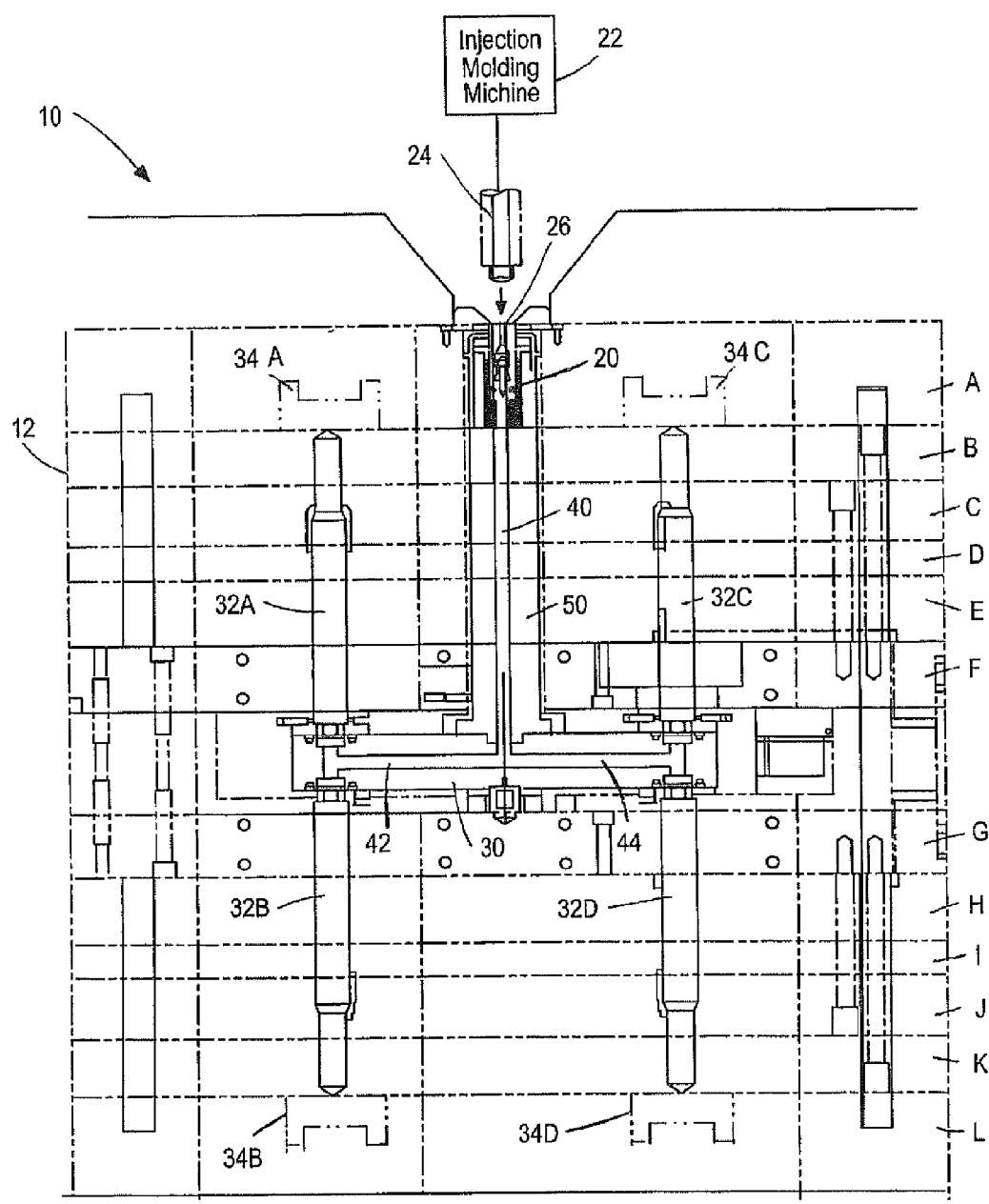
FIG. 1 illustrates an injection molding system in which the present invention can be utilized.

A preferred application for use of the present invention is shown in FIG. 1 and referred to generally by the reference numeral 10. The system 10 includes a stacked molding mechanism 12 which consists of a plurality of mold plates A-L. A shutoff valve mechanism 20 in accordance with the present invention is positioned between the stacked mold mechanism 12 and the injection molding machine 22. The injection molding machine has a machine nozzle 24 which is shown in FIG. 1, and is shown in its retracted position relative to the shutoff valve mechanism 20. The shutoff valve mechanism is preferably positioned in one of the layers of stacked molds or secured to an outer surface of the stacked mold mechanism. A hot runner manifold 30 is also positioned in the stack mold mechanism and plurality of sprue bushings 32 are attached to the hot runner manifold 30. The stacked mold mechanism 12 has a plurality of mold cavities 34 in which plastic molded products are produced.

When the injection molding machine nozzle 24 is moved into position against the inlet 26 of the shutoff valve mechanism 20 and the injection molding cycle is initiated, molten plastic material is injected through the shutoff valve mechanism 20 through elongated passageway 40 into the hot runner manifold 30. The molten plastic material is also passed through passageways 42 and 44 in the hot runner manifold and into the four sprue bushings 32A-32D. Molten plastic material is then injected from these sprue bushings into the mold cavities 34A-34D.

The components of the stacked mold mechanism are preferably heated in a conventional manner in order to maintain the plastic material in the shutoff bushing 20, passageways 40, 42, and 44, and sprue bushings 32A-32D in a molten condition. In this regard, the body 50 of the shutoff valve mechanism 20 is heated by coil heaters or the like on its external surface. The hot runner manifold is also heated in a conventional manner, particularly by cartridge heaters or the like. The sprue bushings 32A-32D typically are heated by band or coil heaters as known in the art.

Figure 2:
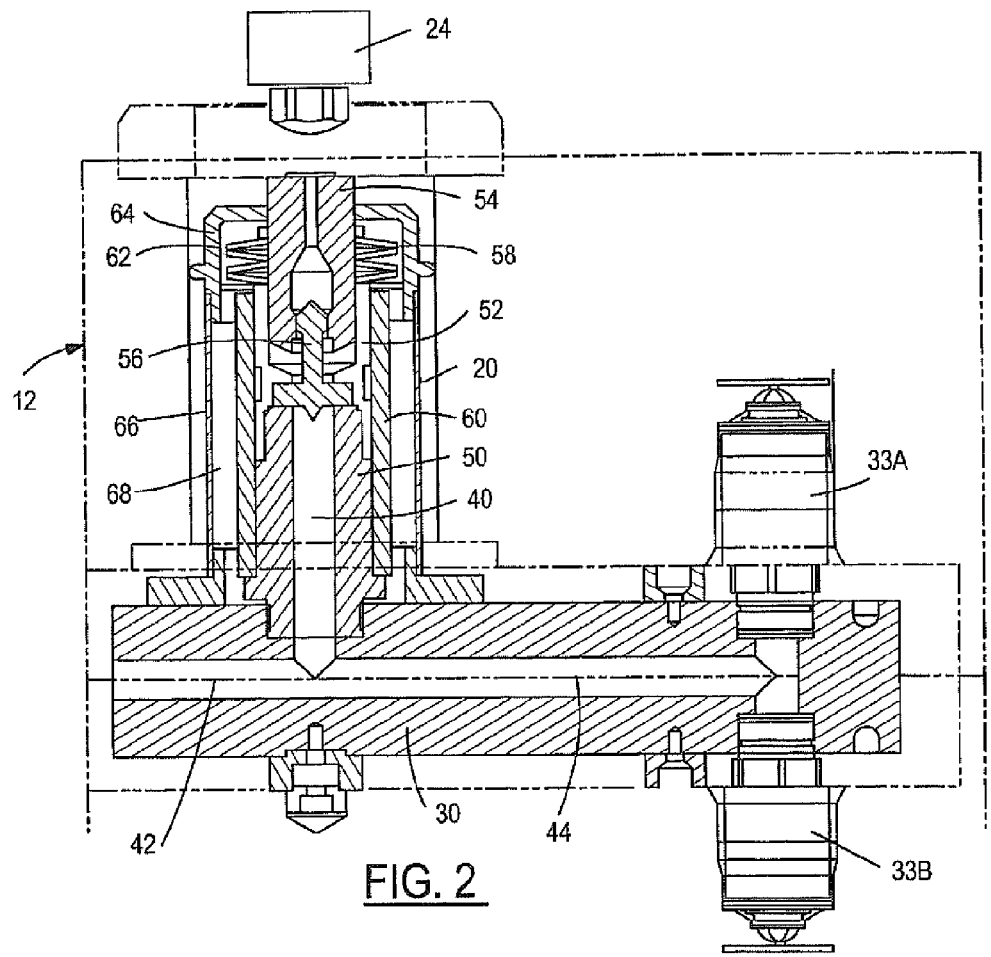
FIG. 2 illustrates a preferred embodiment of a shutoff valve mechanism in accordance with the present invention.
Figure 4:
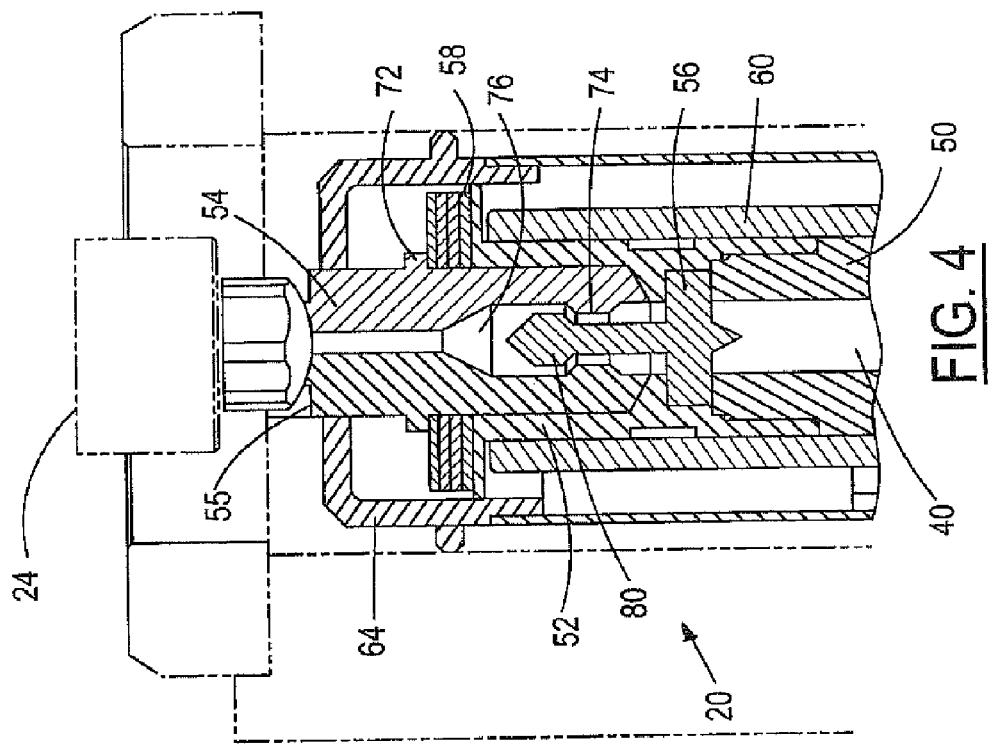
FIG. 4 is an enlarged view of the valve mechanism as shown in FIG. 2 with the valve in the open position.
Figure 3:
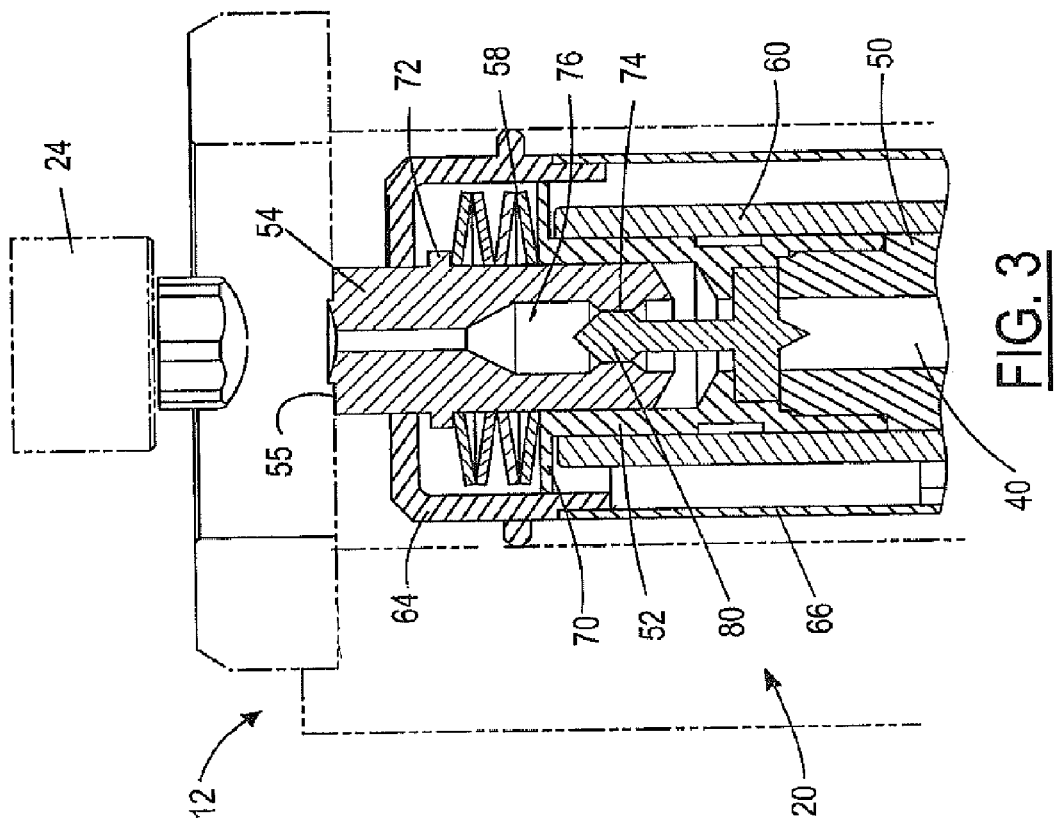
FIG. 3 is an enlarged view of the valve mechanism shown in FIG. 2, with the valve being in its closed position.

Schematic illustrations of a preferred shutoff valve mechanism 20 in accordance with the present invention and which can be used in the stack mold situation as illustrated above, are shown in FIGS. 2-4. The shutoff valve mechanism 20 is shown in an abbreviated or shortened version schematically in FIG. 2 and attached to hot runner manifold 30, while FIGS. 3 and 4 illustrate the actuation of the valve mechanism in the closed and opened positions, respectively. The shutoff valve mechanism 20 is shown in position between the machine nozzle 24 and the hot runner manifold 30.

As indicated above, the hot runner manifold includes passageways such as passageways 42 and 44, which transfer the molten plastic material to sprue bushings, such as sprue bushings 33A and 33B. As known in the art, there are a plurality of various sprue bushings and a particular sprue bushing is selected for the particular molds, cavity, and plastic part which is to be produced by the injection molding process. The size and length of the sprue bushings are determined from these considerations. In addition, the length of the manifold extension nozzle 50, which is positioned between the shutoff bushing 20 and the hot runner manifold, depends on the height of the stack mold mechanism utilized, the particular product to be produced, and the injection molding process to be utilized.

The manifold extension 50 has an internal passageway 40 which conveys the molten plastic material from the shutoff valve into the hot runner manifold 30.

The shutoff valve mechanism 20 includes an outer body member 52, an inner body member 54, a central pin member 56 and a plurality of spring washer members 58. A coil heater member 60 is positioned around the body member 52 and manifold extension 50 in order to maintain the plastic material in the shutoff valve mechanism and manifold extension in a molten condition and at an appropriate temperature.

The shutoff valve mechanism 20 also includes an outer housing 62 including an upper cap member 64 and a lower shell member 66. An insulating air space 68 is maintained between the outer shell member 66 and the coil heater member 60.

The actuation of the shutoff valve mechanism 20 is shown schematically and graphically in FIGS. 3 and 4. The spring mechanism 58 is preferably a plurality of spring washers, such as Belleville spring washers, although a coil spring or the like could be utilized instead. The spring washer members are positioned between a flange member 70 on the body member 52 and a stop or flange 72 positioned on the movable inner body member 54. The inner body member 54 has a first valve member 74 which is positioned on an inner passageway 76 which is centrally positioned in the movable body member.

The pin member 56 is positioned between the manifold extension 50 and the body member 52 and held firmly in place at that position. The pin member 56 has a second valve member 80 which, as shown in FIG. 3, mates with the first valve member 74 which prevents the flow of plastic material through the shutoff valve mechanism and into the passageway 40 and thus into the hot runner manifold, sprue bushings, and mold cavities.

As shown in FIG. 3, the machine nozzle 24 is shown in its retracted position relative to the stacked molds 12. When the injection molding machine and machine nozzle are pushed into the position for injecting the plastic material into the mold cavities, the machine nozzle is moved into the position as shown in FIG. 4. The machine nozzle is forced against the upper end 55 or inlet end of the shut off valve mechanism 20 and forced against the movable inner body member 54. This pushes or forces the inner body member 54 downwardly as shown in FIG. 4 to the position shown in FIG. 4. In this position, the first valve member 74 and second valve member 80 are separated which allows plastic to flow through the passageway 76, through the valve mechanism and into the passageway 40 in the manifold extension 50.

When the injection molding cycle is completed, the molding machine retracts machine nozzle 24 to the position shown in FIG. 3. The biasing force caused by the spring members 58 against the flange 72 returns the movable inner body member 54 to the position shown in FIG. 3. This shuts off the valve mechanism and prevents any backflow of plastic material out of the inlet end 55 of the shutoff valve mechanism.

Figure 7:
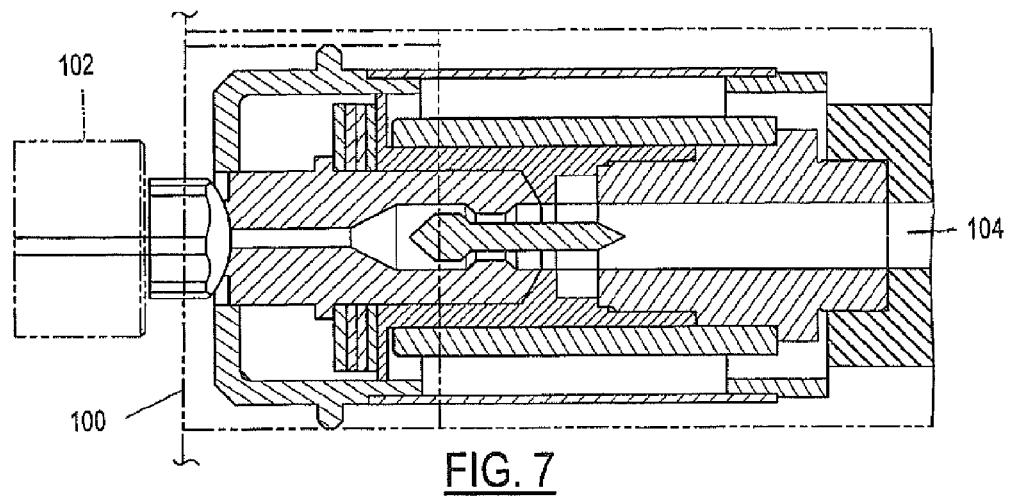
FIGS. 6 and 7 are enlarged views of the valve mechanism as shown in FIG. 5, the valve mechanism being in the closed and opened positions, respectively.
Figure 5:
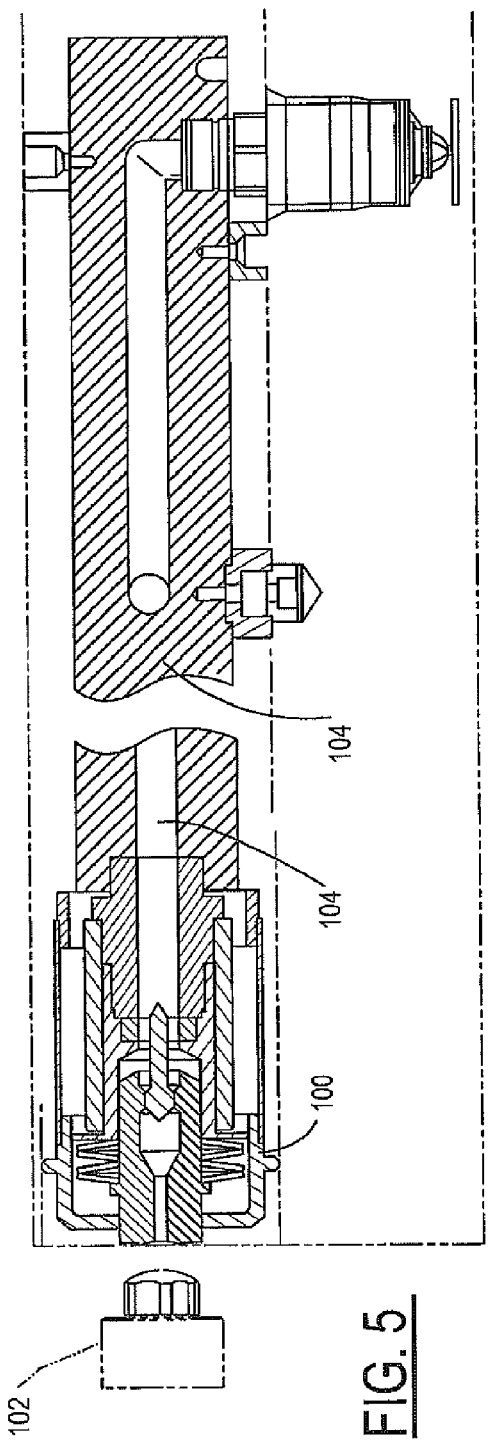
FIG. 5 illustrates an alternate embodiment of a valve mechanism in accordance with the present invention.
Figure 6:
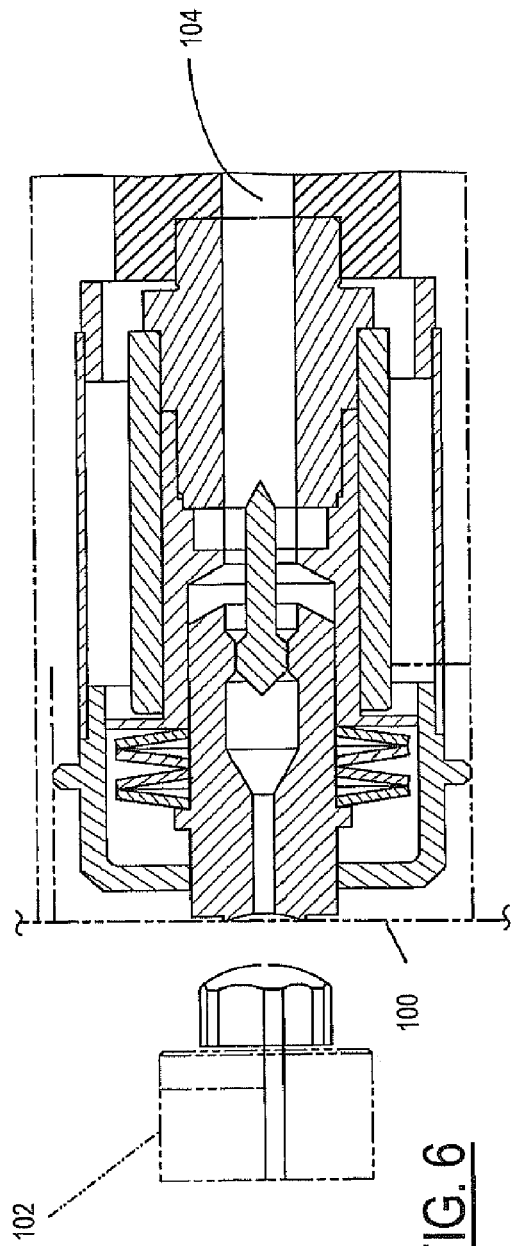

Another preferred embodiment of the present invention is shown in FIGS. 5-7. In this embodiment, the shutoff valve mechanism 100 is shown in use in a rotary mold situation or the like. In this situation, the machine nozzle 20 and shutoff valve mechanism 100 are positioned in horizontal alignment and in communication with the passageway 104 in a hot runner manifold 106 in a horizontal manner rather than a vertical manner.

The shutoff valve mechanism 100 is essentially the same as the shutoff valve mechanism 20 as discussed above and the components thereof are numbered with the same reference numerals. The shutoff valve mechanism 100 also operates in the same manner as the shutoff valve mechanism 20, as shown by comparison of FIGS. 6 and 7 with FIGS. 3 and 4, respectively. When the machine nozzle 102 is positioned in its injection position, the inner body member is forced against the biasing force of the spring washer members which opens the shutoff valve and allows molten plastic material to flow through the manifold extension and into the hot runner manifold. Similarly, when the plastic injection molding cycle is completed, the inner body member is returned to its rest position by the biasing force from the spring washer members, thus closing the valve and preventing any backflow of plastic material.

With the present invention, the inlet to the shutoff valve mechanism is automatically closed when the machine nozzle is retracted and is no longer applying a force against it. The advantage is that the hot runner system retains its internal pressure and prevents ambient air from entering the system. These can cause inconsistencies in the molding process and lead to poor part quality.

While particular embodiments of the invention have been shown and described, numerous variations and alternative embodiments will occur to those skilled in the arm. Accordingly, it is intended that the invention be limited only in terms of the appended claims.

What is claimed is:

1. A shut-off valve mechanism for an injection molding system, said valve mechanism comprising:
   a housing assembly comprising a cap member and shell member;
   an outer body member positioned in said housing assembly and having an internal passageway therein and a first external flange member thereon;
   a coil heater member positioned in said housing assembly and substantially along the axial length of said outer body member, said heater member maintaining material in said shut-off valve mechanism at a prerequisite temperature;
   said heater member being spaced from said shell member;
   a movable inner body member positioned in said internal passageway, said movable inner body member having a central passageway and first valve member thereon and a second external flange member thereon;
   a pin member having a second valve member thereon, said pin member having a pin body member in contact with said outer body member and a pin head member positioned in said central passageway of said inner body member, said second valve member positioned on said pin head member;
   said first and second valve members forming a valve mechanism which when closed prevents the flow of material therethrough and which when open allows the flow of material therethrough; and a spring biasing member positioned between said first and second external flange members and biasing said valve mechanism to said closed position.

2. An injection molding system comprising:
   an injection molding machine having a machine nozzle for injecting molten plastic material into a manifold;
   a manifold having a plurality of passageways for conveying molten plastic material;
   a plurality of sprue bushings attached to the manifold for conveying molten plastic material into at least one mold cavity;
   a shut-off valve mechanism positioned between the injection molding machine and the manifold;
   said shut-off valve mechanism comprising:
   a housing assembly comprising a cap member and shell member;
   an outer body member positioned in said housing assembly and having an internal passageway therein and a first external flange member thereon;
   a coil heater member positioned in said housing assembly and substantially along the axial length of said outer body member, said heater member maintaining material in said shut-off valve mechanism at a prerequisite temperature;
   said heater member being spaced from said shell member;
   a movable inner body member positioned in said internal passageway, said movable inner body member having a central passageway and first valve member thereon and a second external flange member thereon;
   a pin member having a second valve member thereon, said pin member having a pin body member in contact with said outer body member and a pin head member positioned in said central passageway of said inner body member, said second valve member positioned on said pin head member;
   said first and second valve members forming a valve mechanism which when closed prevents the flow of material therethrough and which when open allows the flow of material therethrough; and
   a spring biasing member positioned between said first and second external flange members and biasing said valve mechanism to said closed position.

3. The injection molding system as described in claim 2 further comprising a manifold extension member positioned between said shut-off valve mechanism and said manifold.

4. The injection molding system as described in claim 2 wherein said manifold is a hot runner manifold.

* * * * *